E. M. THOMPSON.
AUTOMATIC DEVICE FOR COMPENSATING MAGNETIC SPEED INDICATORS FOR VARIATIONS IN TEMPERATURE.
APPLICATION FILED MAY 27, 1913.

1,181,186. Patented May 2, 1916.

UNITED STATES PATENT OFFICE.

EDWARD M. THOMPSON, OF BELOIT, WISCONSIN, ASSIGNOR TO STEWART-WARNER SPEEDOMETER CORPORATION, OF BELOIT, WISCONSIN, A CORPORATION OF VIRGINIA.

AUTOMATIC DEVICE FOR COMPENSATING MAGNETIC SPEED-INDICATORS FOR VARIATIONS IN TEMPERATURE.

1,181,186.     Specification of Letters Patent.     Patented May 2, 1916.

Application filed May 27, 1913. Serial No. 770,131.

*To all whom it may concern:*

Be it known that I, EDWARD M. THOMPSON, a citizen of the United States, residing at Beloit, in the county of Rock, State of Wisconsin, have made a new and useful Invention in Automatic Devices for Compensating Magnetic Speed-Indicators for Variations in Atmospheric Temperature, of which the following is a specification.

This invention relates to devices for automatically compensating magnetic speed indicators and similar instruments for variations in atmospheric temperature.

The object of the invention is to provide means which are simple and efficient for correcting the errors of indication of speed indicators and similar devices of the magnetic type, due to the effects of variations in atmospheric temperatures.

A further object of the invention is to provide means for automatically varying the condition of the magnetic field of magnetic speedometers or other similar devices, by and in accordance with variations in atmospheric temperature, whereby to secure accuracy of indication at different atmospheric temperatures.

A further object of the invention is to provide means of the nature and character referred to, and automatically moving the magnet or the field concentrating mass or armature, the one relatively to and from the other, to accomplish the compensation of errors of indication due to variations in atmospheric temperatures.

Other objects of the invention will appear more fully hereinafter.

This invention consists substantially in the construction, combination, location and relative arrangement of parts all as will be more fully hereinafter set forth, as shown in the accompanying drawing, and finally pointed out in the appended claims.

Referring to the accompanying drawing and to the various views and reference signs appearing thereon:—

Figure 1:
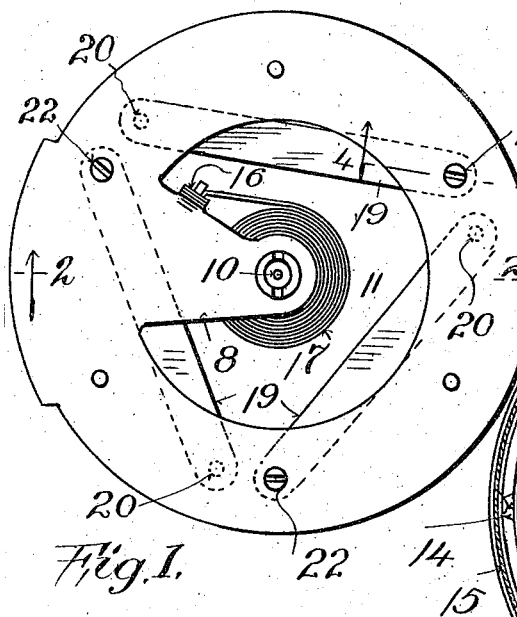
Figure 3:
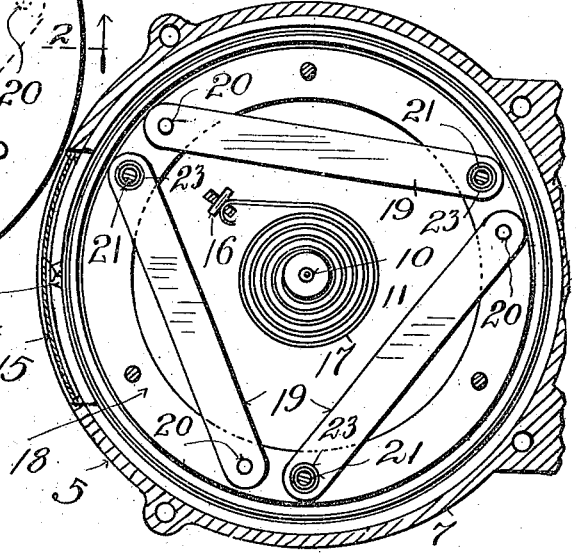
Figures 2, 4:
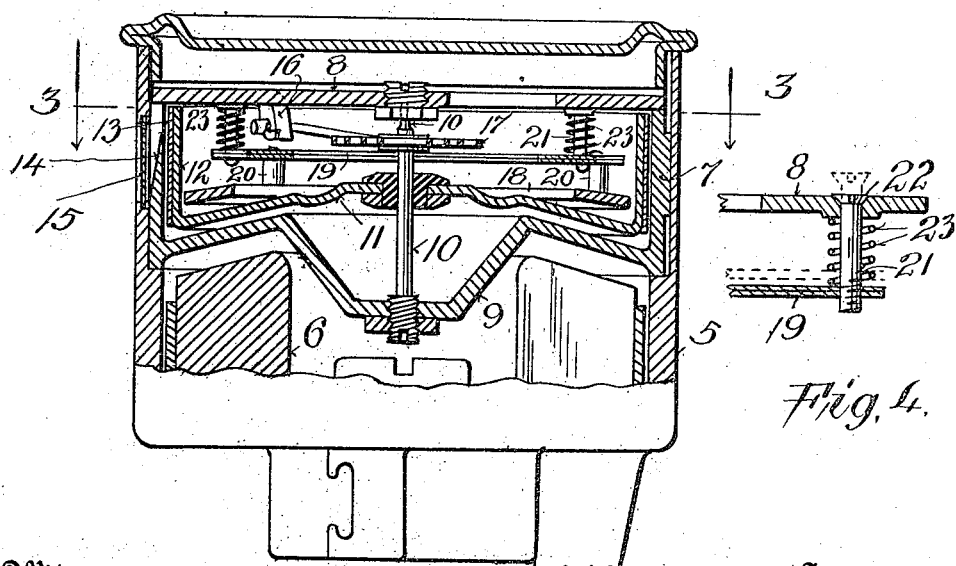

Figure 1 is a top plan view of a portion of a speed indicator showing the application thereto of temperature compensating devices embodying the principles of my invention. Fig. 2, is a view in central longitudinal section of a magnetic speed indicator showing the temperature compensating devices applied thereto in accordance with the principles of my invention, the plane of section being indicated by the line 2, 2, Fig. 1. Fig. 3, is a transverse sectional view on the line 3, 3, Fig. 2, looking in the direction of the arrows. Fig. 4, is a broken detail view in section on the line 4, 4, Fig. 1.

The same part is designated by the same reference numeral wherever it occurs throughout the several views.

The essential elements of a magnetic speed indicator include means for producing a rotating magnetic field and a displaceable member normally but yieldingly biased or restrained in an initial or "zero" position, and which member is subjected to the action of said field whereby it is displaced from its initial position to an extent which is proportional to the speed at which the means for producing the rotating magnetic field is driven. In one form of concrete embodiment of speed indicator including these elements, the rotating magnetic field is produced by rotating a permanent magnet from or in proportional relation to the part the speed of which is to be indicated by the instrument. The member which is subjected to the influence of the resulting rotating magnetic field, and which is normally but yieldingly biased to an initial or zero position, is in the form of an electrically conductive member; the action of the rotating magnetic field producing therein electric currents which exert a drag effect upon said member tending to displace it from its initial or "zero" position to an extent depending upon the strength of the rotating magnetic field. Associated with the displaceable member is one element of a scale-and-pointer device for indicating the extent of displacement of the member.

In devices of this nature it has been the custom to so adjust the instrument that the indications thereof will be correct at all speeds for a given atmospheric temperature,—say ordinary shop temperature. The electric conductivity of the displaceable member, however, varies with its temperature. As the temperature increases the resistance thereof increases, and any increase in such resistance decreases the magnetic drag exerted thereon by the rotating magnetic field. Similarly any decrease in temperature below the given or shop temperature to which the instrument is originally adjusted decreases the resistance of the displaceable member thereby increasing the magnetic drag action exerted thereon by the rotating magnetic field. The result is that at higher atmospheric temperatures the speed indications or readings of the instrument are lower than the actual or true speed while at the lower temperatures they are higher than actual or true speed.

It is among the special purposes of my present invention to provide means for making automatic correction of variations or errors in the readings of such instruments due to variations in atmospheric temperatures, and in the accomplishment of these special purposes I employ a concentrating device, which in one form of embodiment comprises a ring of soft iron or other similar material arranged as an armature for the permanent magnet and so disposed relatively to the magnet as to concentrate the magnetic field of the latter within the space in which the displaceable member is positioned and, in accordance with the principles of my invention, I provide means actuated by and in accordance with variations in atmospheric temperature to vary the effect of said magnetic field upon the displaceable member. In a more restricted and limited sense, I propose to automatically shift the position of the armature, which, for convenience, may be called the magnetic mass, toward and from the magnet, and to accomplish such automatic shifting of the disk by and in accordance with variations in atmospheric temperatures.

In the drawing I have shown an operative practical embodiment of my invention, for the purpose of illustrating the principles thereof, and wherein 5, is a casing in which is mounted a permanent magnet 6, shown in this instance, as a magnet of the split ring type, and designed to be axially rotated through suitable connections (not shown) from the part the speed of which is to be indicated. Mounted within the casing is a stationarily held cup 7, the top plate 8, and bottom 9, of which, carry bearings in which is journaled a shaft 10. Upon this shaft to rotate therewith is the member 11 of electrically conductive material, such, for instance, as aluminum. Associated with this member is one element of a scale-and-pointer device. In this instance a circular flange 12 of the member 11, carries a scale 13, which coöperates with a fixed pointer 14, the latter being disclosed through a transparent section or window 15, of the case. Connected at one end to the shaft 10, and at the other end to a stationary part 16 of the cup is a coiled hairspring 17, the tension of which is applied to the shaft to hold or restrain it and the scale element 13, in an initial or "zero" position with reference to the pointer 14. The armature or magnetic mass is indicated at 18, and in this instance, is in the form of a closed ring which is so positioned that the member 11 is located in the space between the same and the magnet 6. The ring 18, is shown as being suspended from the top plate 8, of the cup 7, by the bi-metallic strips 19. In the particular form shown three of such strips are employed and these are disposed in symmetrical relation with respect to each other and the ring 18 which they support. Each strip 19 is composed of two short straight flat pieces of metal having relatively different coefficients of expansion under the effects of heat, and each is secured at one end to a post 20, carried by the ring 18, while at its other end each strip has a threaded stud 21, screwed into it. The studs 21 work freely through openings in the top plate 8, and are provided with heads 22, which fit into countersunk seats in the outer surface of plate 8. Each stud 21, carries a coil spring 23, which is interposed between the plate 8 and the bar or strip 19.

At the given or shop temperature at which the instrument is initially adjusted and calibrated, the bimetallic bars or strips 19, are preferably straight and flat, but under the influence of variations from the given or shop temperature these strips assume a curvature in greater or less degree and in one direction or the other, according to the extent of such temperature variation, and according to whether such variation is to a higher or a lower temperature than that at which the instrument is adjusted or calibrated. This action causes the magnetic mass 18 to be shifted toward or away from the magnet, as the case may be, thereby correspondingly varying the condition of the magnetic field, that is making it stronger in case of higher temperatures and weakening it in case of lower temperatures to compensate for the corresponding variations in the electrical resistance of the displaceable member, and the resulting variations in the drag action exerted thereon by the magnetic field.

The arrangement above described results in a flexibility of connection of one end of each of the bimetallic bars which enables them to properly accomplish their functions of shifting the field ring bodily toward and from the surface of the magnet without tilting said ring, and without binding or buckling the bars.

While I have shown and described one specific form of device embodying the principles of my invention it is evident that many specifically different structures may be devised to carry out said principles. I do not desire, therefore, in the broadest scope of my invention, as defined in the claims, to be limited or restricted to the exact and specific structure shown and described.

What I claim as new and useful and of my own invention, and desire to secure by Letters Patent is:—

1. In a magnetic speed indicator, a magnet mounted to rotate, a magnetic mass associated therewith, a bimetallic member connected at one end to said mass, the other end of said member being loosely supported and an electrically conductive scale member interposed between said magnet and mass.

2. In a magnetic speed indicator, a magnet mounted to rotate, a magnetic mass arranged in juxtaposition to said magnet, a support for said mass including a plurality of bi-metallic strips each connected at one end to said mass and loosely supported at its other end, and an electrically conductive scale member interposed between said magnet and mass.

3. In a magnetic speed indicator, a magnet mounted to rotate, a magnetic mass arranged in juxtaposition to said magnet, posts carried by said mass, bimetallic strips each having one end secured to a post on the mass, means for loosely supporting the other end of each strip, and an electrically conductive scale member interposed between the mass and magnet.

4. In a magnetic speed indicator, a magnet mounted to rotate, a magnetic mass arranged in juxtaposition to said magnet, a support for said mass including bimetallic strips each having one end attached to said mass, a stud carried by the other end of each strip, a supporting member in which said studs are movably mounted and an electrically conductive scale member interposed between said mass and magnet.

5. In a magnetic speed indicator, a magnet mounted to rotate, a magnetic mass arranged in juxtaposition to said magnet, a support for said mass including bimetallic strips each having one end attached to said mass, a stud carried in the other end of each strip, a supporting member in which said studs are movably mounted, a spring interposed between said supporting member and each strip, and an electrically conductive scale member interposed between said magnet and mass.

6. In a magnetic speed indicator, a magnet and a magnetic mass associated together, one of these parts mounted to rotate, bimetallic strips each connected at one end to said mass, means for loosely supporting the other end of each strip, and an electrically conductive scale member interposed between said mass and magnet.

In testimony whereof I have hereunto set my hand in the presence of the subscribing witnesses, on this 23d day of May A. D. 1913.

EDWARD M. THOMPSON.

Witnesses:
O. E. GRIMM,
L. E. WILSON.